(12) United States Patent
Smith, III (10) Patent No.: US 6,575,430 B1
(45) Date of Patent: Jun. 10, 2003

(54) HYDRAULIC COUPLING WITH DOVETAIL SEAL HAVING MULTIPLE RADIAL SEALING SURFACES

(75) Inventor: Robert E. Smith, III, Missouri City, TX (US)

(73) Assignee: National Coupling Company, Inc., Staffordshire, TX (US)

( * ) Notice: Subject to any disclaimer, the term of this patent is extended or adjusted under 35 U.S.C. 154(b) by 0 days.

(21) Appl. No.: 10/119,471

(22) Filed: Apr. 10, 2002

(51) Int. Cl.[7] .................................................. F16L 37/32
(52) U.S. Cl. .................. 251/149.7; 251/149.6; 285/108; 285/917; 285/110
(58) Field of Search ............... 137/614.04, 614.03, 137/614.05, 614; 251/149.6, 149.7; 285/108, 110, 111, 113, 917

(56) References Cited

U.S. PATENT DOCUMENTS

| | | | |
|---|---|---|---|
| 2,565,923 A | * 8/1951 | Hrdlicka, Jr. | ........... 285/108 X |
| 3,279,806 A | 10/1966 | Bialkowski | |
| 3,829,106 A | 8/1974 | Wheelock | |
| 3,918,485 A | 11/1975 | Weber et al. | |
| 4,293,138 A | * 10/1981 | Swantee | ................ 285/110 X |
| 4,632,406 A | 12/1986 | Akkerman | |
| 4,635,945 A | 1/1987 | Beck | |
| 4,637,470 A | 1/1987 | Weathers et al. | |
| 4,641,841 A | 2/1987 | Regan | |
| 4,658,847 A | 4/1987 | McCrone | |
| 4,768,538 A | 9/1988 | Mintz et al. | |
| 4,900,071 A | 2/1990 | Smith, III | |
| 5,026,074 A | 6/1991 | Hoes et al. | |
| 5,052,439 A | 10/1991 | Smith, III | |
| 5,099,882 A | 3/1992 | Smith, III | |
| 5,203,374 A | 4/1993 | Smith, III | |
| 5,232,021 A | 8/1993 | Smith | |
| 5,368,070 A | 11/1994 | Bosley | |
| 5,390,702 A | 2/1995 | Smith, III | |
| 5,556,139 A | 9/1996 | Wilkins | |
| 5,979,499 A | 11/1999 | Smith | |
| 5,983,934 A | 11/1999 | Smith, III | |
| 6,007,106 A | * 12/1999 | Wilkins | ..................... 285/110 |
| 6,123,103 A | 9/2000 | Smith, III. | |
| 6,179,002 B1 | 1/2001 | Smith, III | |
| 6,206,040 B1 | 3/2001 | Smith, III | |

* cited by examiner

*Primary Examiner*—Kevin Lee
(74) *Attorney, Agent, or Firm*—Trop, Pruner & Hu, P.C.

(57) ABSTRACT

An undersea hydraulic coupling member having a ring-shaped seal with multiple sealing surfaces extending radially inwardly therefrom is disclosed. The multiple sealing surfaces help guide the probe of the male coupling member into the female member without the risk of drag or galling of the receiving chamber or metal seal retained therein. The seal has an interfit with reverse inclined shoulders in the female member to restrain the seal from moving radially inwardly due to vacuum or low pressure.

20 Claims, 8 Drawing Sheets

HYDRAULIC COUPLING WITH DOVETAIL SEAL HAVING MULTIPLE RADIAL SEALING SURFACES

BACKGROUND OF THE INVENTION

1. Field of the Invention

This invention relates, in general, to hydraulic couplings, and specifically to hydraulic couplings used in undersea drilling and production applications. More particularly, the invention involves an undersea hydraulic coupling having an improved radial seal with a dovetail interfit with the female coupling member for holding and positioning the seal in place.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical body or retainer. When the male and female portions of the coupling are parted under pressure, the retainer prevents the metal seal from blowing out through the bore of the female member.

U.S. Pat. No. 4,900,071 to Robert E. Smith III discloses an undersea hydraulic coupling with an elastomeric seal that is restrained from radial movement into the central bore of the female member by a circumferential shoulder on one or both surfaces adjacent the seal. Preferably, the seal has a dovetail interfit with one or both surfaces. U.S. Pat. Nos. 5,052,439, 5,099,882, 5,203,374, 5,232,021 to Robert E. Smith III also show undersea hydraulic couplings with these seals. An inner cylindrical surface of the annular seal engages the circumference of the male member or probe as the probe is inserted into the female member. As the male member or probe is pulled out of the female member bore, the leading face of the male member reaches the soft annular seal intermediate that bore. When the face reaches the midpoint of the soft annular seal, the dovetail interfit prevents the seal being imploded into the bore, as the seawater and/or hydraulic fluid enter the bore at high pressure.

If the probe of the male coupling member is imperfectly aligned with the female coupling member, it can drag against the female coupling bore or receiving chamber, and drag against each seal retained in the bore. The drag can result in galling to the surfaces of the respective coupling members. The drag also can damage the seals retained in the female coupling member, especially pressure energized radial metal seals that seal around the circumference of the male coupling member.

To help align the male coupling member when it enters the female bore or receiving chamber, some undersea hydraulic couplings include two or more redundant radial seals. Two or more seals provide guide points to help the male member enter the bore or receiving chamber without galling and damage to the sealing surfaces. Additionally, two or more redundant seals reduce the risk that hydraulic fluid will leak from the coupling at higher pressures and greater subseas depths. However, couplings designed for use of two or more such seals require additional components for retaining the seals, increasing the complexity and cost of the coupling design.

Accordingly, an undersea hydraulic coupling is needed having a seal or seals that can reduce the drag or galling when the male coupling member enters the female coupling member, but without the additional seal retaining components.

SUMMARY OF THE INVENTION

The present invention overcomes the above mentioned problems and disadvantages by providing an undersea hydraulic coupling with a ring-shaped elastomeric seal having two or more radial sealing surfaces at the inner circumference thereof. Each of the sealing surfaces at the inner circumference engages the probe of the male coupling member, providing guide points to help ensure proper alignment between the coupling members, prevent or reduce the risk that the male coupling member will drag against the female coupling member during engagement or disengagement, and prevent or reduce the risk of galling of the surfaces and seals retained therein.

On each side of the elastomeric seal, opposing inclined circumferential shoulder surfaces have an interfit with the seal and prevent the seal from imploding and/or radially moving into the bore upon separation of the female member and male member. The seal has inclined surfaces that interfit with the opposing inclined shoulder surfaces.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Undersea hydraulic couplings are generally connected to opposing plates of a manifold and are held together by bolts or hydraulic members attached to the plates. The male and female members may be attached to the opposing plates using various means, such as set screws or threads. Techniques for attaching members to such plates are well known to those skilled in the art.

Figure 1:
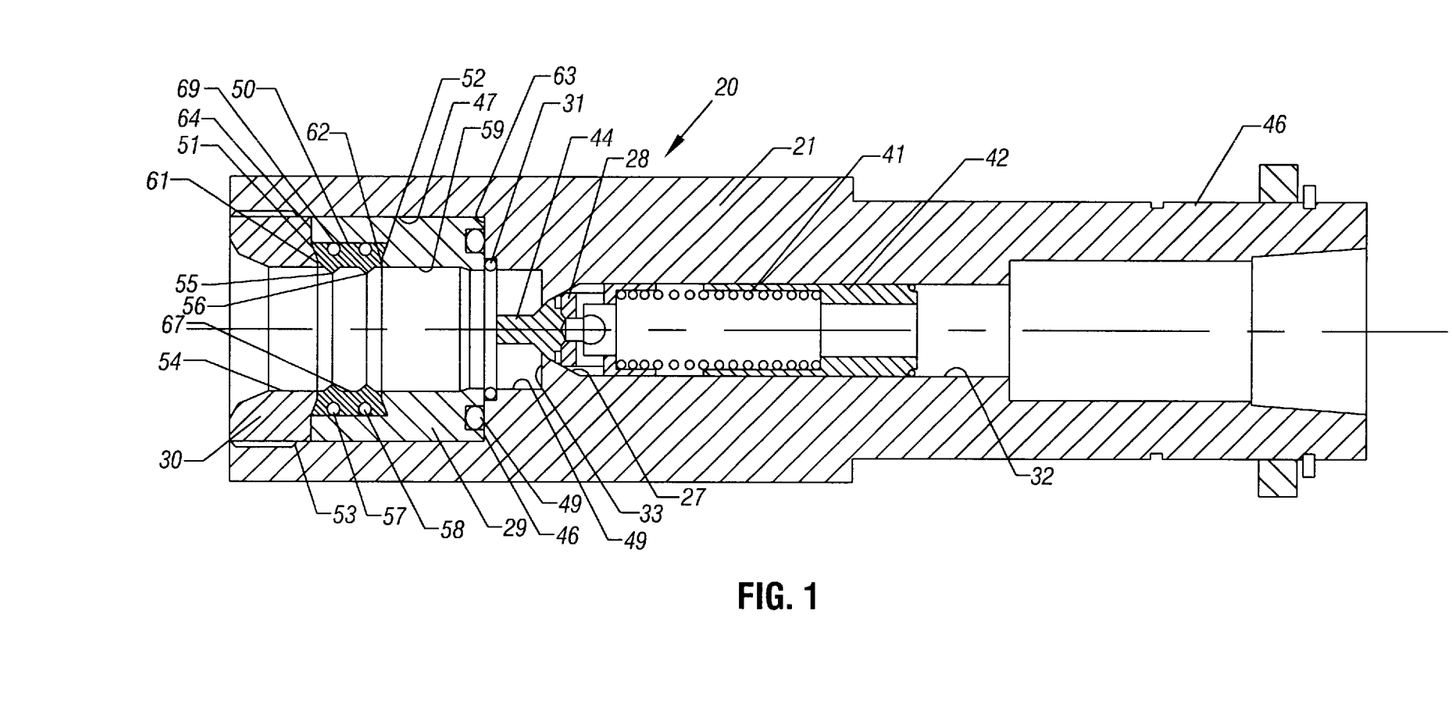
FIG. 1 is a section view of the female member of the coupling of the present invention according to a first preferred embodiment.

As shown in FIG. 1, in a first preferred embodiment, female member 20 comprises body 21, handle 48 which may be threaded to a manifold plate, and central bore 32 which has several variations in its diameter as it extends through the female member. The first end of the bore may be internally threaded for connection to a hydraulic line. A cylindrical passageway extends longitudinally within the female member body and terminates at valve seat 27. Adjacent valve seat 27 is shoulder 33 which forms one end of receiving chamber 34.

In the first preferred embodiment, the receiving chamber which receives the probe of the male member has a stepped internal diameter with internal shoulders 33, 35 and 63. The receiving chamber has a first smaller diameter 34 and a second larger diameter 47.

Optionally, the female member may include poppet valve 28 which is slidably received within the cylindrical passageway. The poppet valve is conical in shape and is urged by valve spring 41 into a seated position against valve seat 27. When the poppet valve is in a closed position against the valve seat, it seals fluid from flowing between the male member and the female member. Hollow spring collar 42 anchors the valve spring 41 and is held in place by a collar clip. Actuator 44 extends from the apex of the poppet valve.

Figure 3:
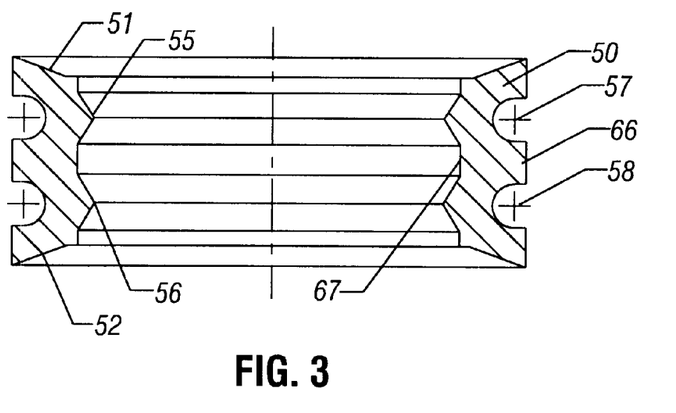
FIG. 3 is a section view of the dovetail seal with multiple radial sealing surfaces according to the first embodiment.

Ring shaped seal 50 is positioned in the receiving chamber of the female member. The ring shaped seal is an elastomer or polymer seal that is flexible and resilient. As shown in FIG. 3, the seal has a first inclined shoulder surface 52 and a second inclined shoulder surface 51. The axial thickness of the elastomeric seal at outer circumference 66 is greater than the axial thickness of the seal at inner circumference 67. The seal has a generally wedge-shaped cross section. The seal has at least two radial sealing surfaces 55, 56 extending inwardly from the seal's inner circumference 67. Each of the radial sealing surfaces extends radially inwardly from the inner circumference to engage the probe of the male member when the probe is inserted through the seal. Each of the radial sealing surfaces is elastically deformed by the probe when it is inserted through the seal. The two radial sealing surfaces provide guide points to help align and guide the probe when it is inserted through the seal into the receiving chamber. The pair of radial sealing surfaces reduces or eliminates the problem and resulting damage from drag against the female bore and/or galling of the coupling surfaces and seal surfaces.

Additionally, in the first preferred embodiment of FIG. 1, the seal has grooves 57, 58 in its outer circumference 66. O-rings may be positioned in each of the grooves. Alternatively, instead of grooves and O-rings, the seal may have a plurality of integral projections which extend radially outwardly from the outer circumference.

In the embodiment of FIG. 1, the seal is restricted from being imploded into the receiving chamber due to low pressure or vacuum because the seal has an interfit with reverse inclined shoulder surface 62 of seal retainer 29 and reverse inclined shoulder surface 61 of locking member 30. The seal retainer may be a cylindrical sleeve that slides into the second diameter 47 of the receiving chamber. Alternatively, the seal retainer may be threaded to the female member or engaged to the female member by other means. In the first preferred embodiment, when the seal retainer is fully engaged with the female member, first end 46 of the seal retainer abuts shoulder 63. The seal retainer holds hollow radial metal seal 31 on internal shoulder 35.

In the first preferred embodiment, the seal retainer has a first internal circumferential surface 59 adjacent the first end thereof and a second internal circumferential surface 69 adjacent the second end thereof. The internal diameter of the first inner circumferential surface is smaller than the internal diameter of the second internal circumferential surface. Reverse inclined shoulder 62 is between the first and second internal circumferential surfaces. The reverse inclined shoulder has an interfit with seal 50 to restrain the seal from moving radially inwardly. O-ring 49 is positioned in a groove at the first end 46 of the seal retainer to provide a face-type seal between the seal retainer and shoulder 63.

In the first preferred embodiment, locking member 30 engages the female coupling member using threads 53 or other means. When the locking member is fully secured to the female coupling member, first end 64 abuts the seal retainer and holds the seal retainer in place. The locking member has an internal diameter 54 that allows insertion of the probe of the male member therethrough. Reverse inclined shoulder surface 61 holds seal 50 in place and restrains the seal from moving radially inwardly.

Figure 2:
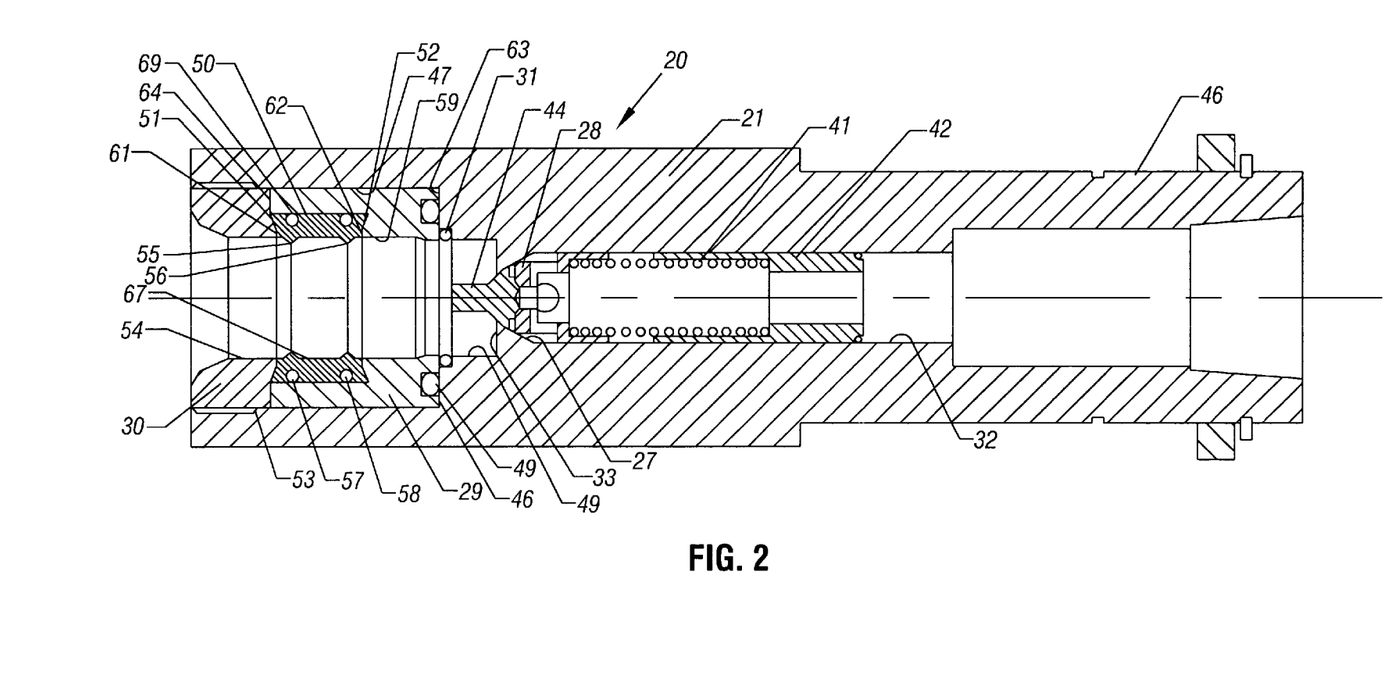
FIG. 2 is a section view of the female member of the coupling of the present invention according to a second preferred embodiment.
Figure 4:
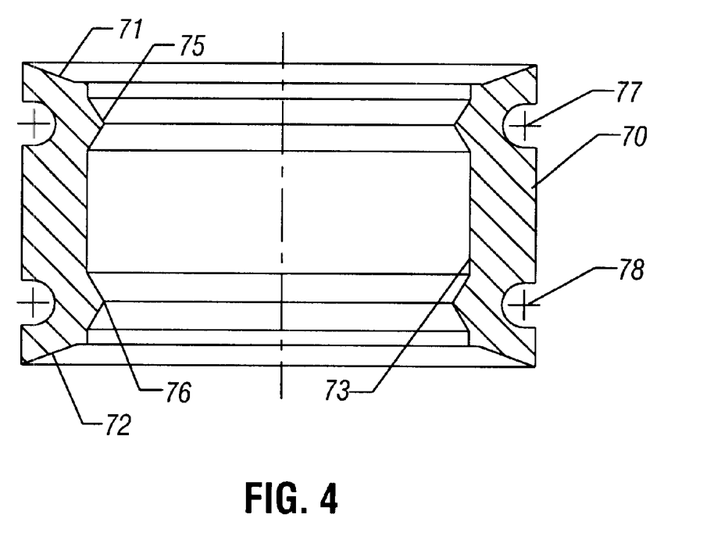
FIG. 4 is a section view of the dovetail seal with multiple radial sealing surfaces according to the second embodiment.

A second preferred embodiment of the invention is shown in FIG. 2. Seal 70 is lengthened so that it may be used with a longer probe. The seal length is based on the length of the probe and/or the depth of the female receiving chamber. Greater spacing of the radial sealing surfaces also helps align the male and female coupling members and avoid damage to the metal seal in the coupling. In the second preferred embodiment, radial sealing surfaces 75 and 76 extend inwardly from inner circumference 73 and are separated further than in the first preferred embodiment. In this embodiment, seal 70 is positioned on the second inner circumferential surface 99 of seal retainer 39. Reverse inclined shoulder surfaces 71, 72 interfit with reverse inclined shoulder 61 of the locking member and reverse inclined shoulder 82 of the seal retainer. The seal of the second preferred embodiment also is shown in FIG. 4.

The outer circumference of the seal has grooves 77, 78 for holding O-rings that seal with inner circumferential surface 99. Alternatively, the seal may have one or more projections around its outer circumference, the projections being integral with the seal.

Figure 5:
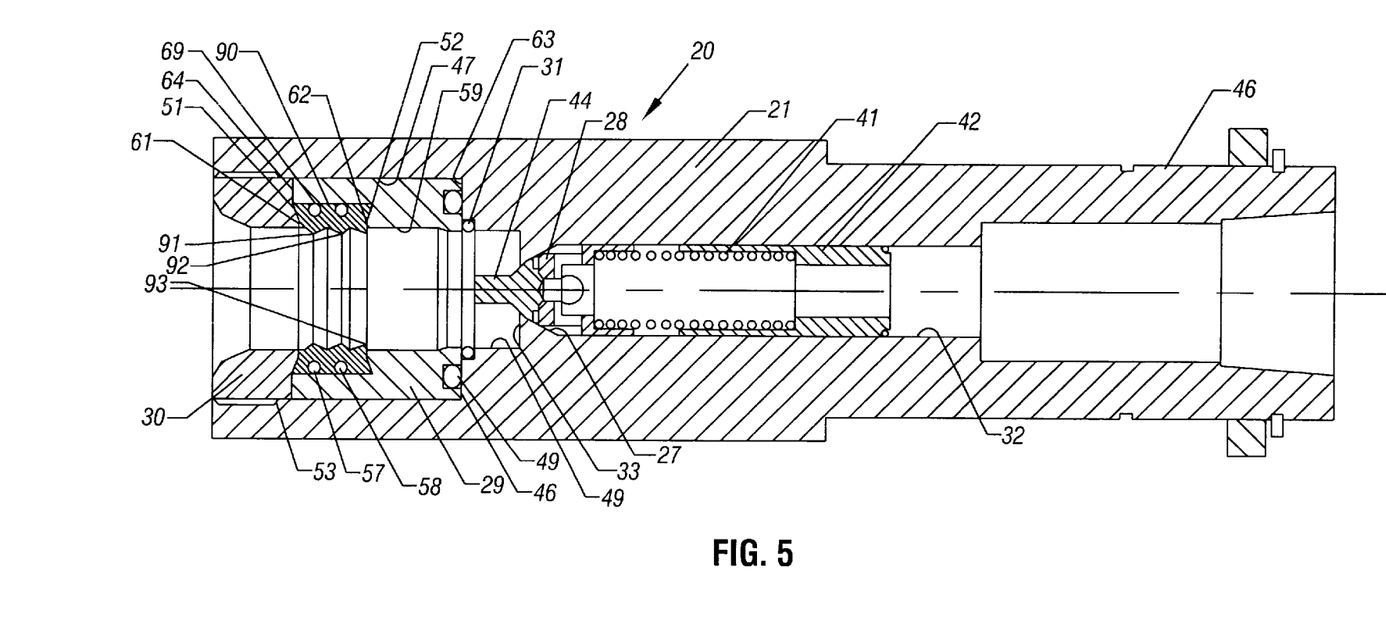
FIG. 5 is a section view of the female member of the coupling of the present invention according to a third preferred embodiment.
Figure 6:
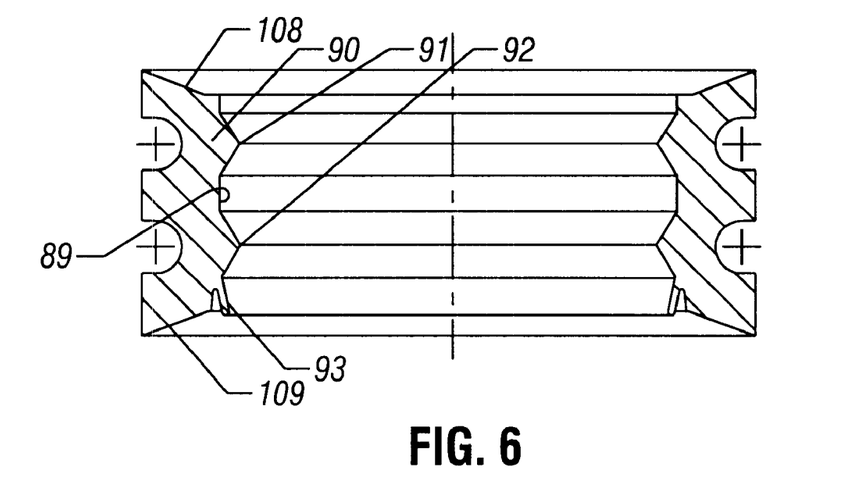
FIG. 6 is a section view of the dovetail seal with multiple radial sealing surfaces according to the third embodiment.

A third preferred embodiment is shown in FIG. 5. In this embodiment, seal 90 includes a third radial sealing surface 93, in addition to radial sealing surfaces 91, 92 that project radially inwardly from inner circumference 89. In this embodiment, the third radial sealing surface may be pressure energized by hydraulic fluid pressure in the coupling to enhance the radial seal with the probe of the male coupling. As hydraulic fluid at high pressure enters cavity 92, surface 91 is urged radially inwardly against the probe. The seal has inclined shoulders 108, 109. This seal is shown in FIG. 6.

Figure 7:
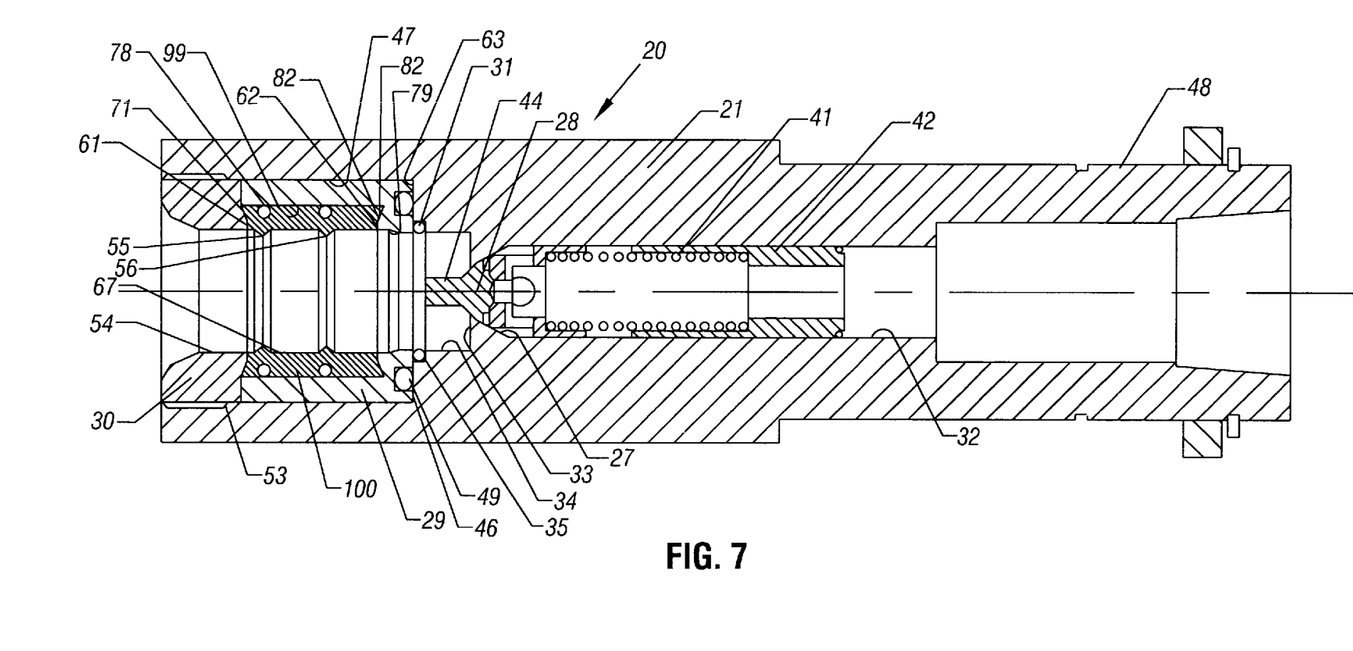
FIG. 7 is a section view of the female member of the coupling of the present invention according to a fourth preferred embodiment.

A fourth preferred embodiment is shown in FIG. 7. The fourth embodiment includes seal 100 with three radial sealing surfaces 101, 102, 103, spaced further apart axially to accommodate male coupling members with lengthened probe sections. The third radial sealing surface may be pressure energized by hydraulic fluid pressure to enhance the radial seal with the probe.

Figure 8:
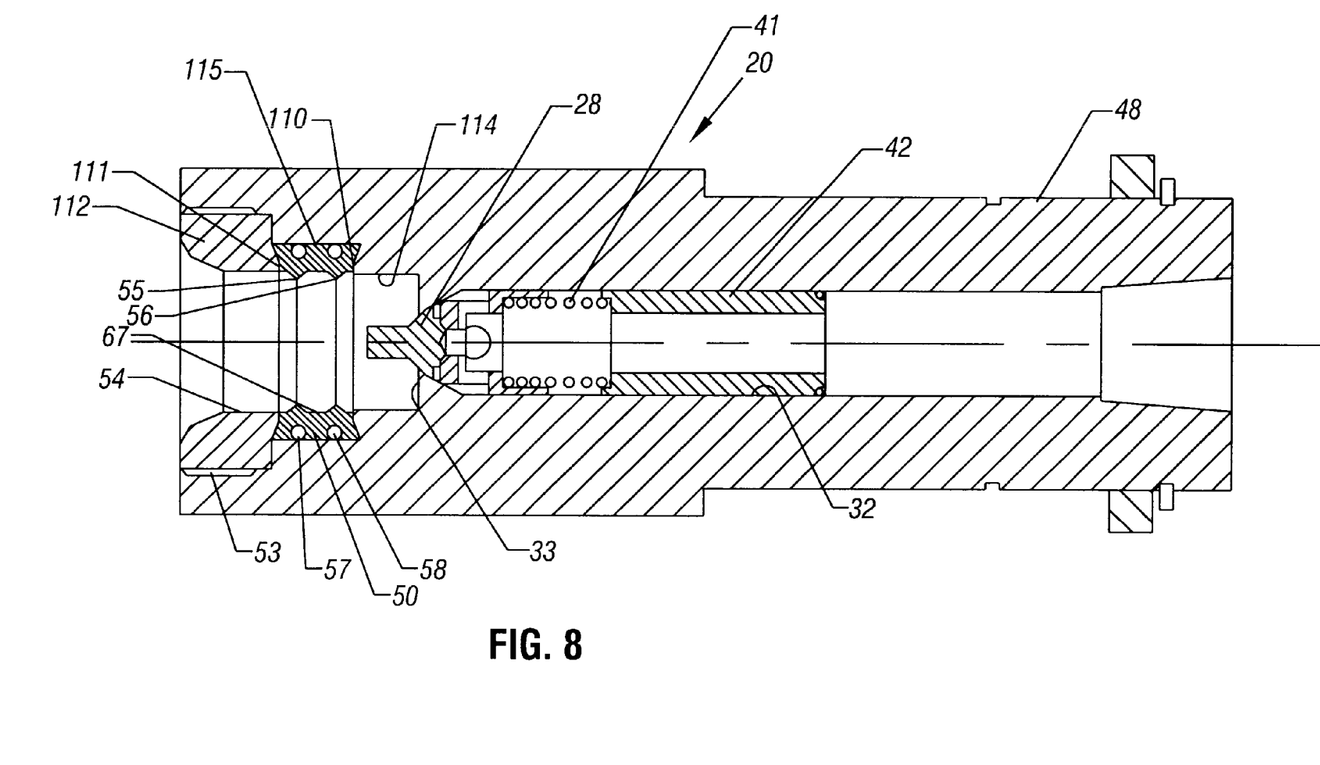
FIG. 8 is a section view of the female member of the coupling of the present invention according to a fifth preferred embodiment.

A fifth preferred embodiment is shown in FIG. 8. In this embodiment, seal 50 has an interfit between reverse inclined shoulder 110 in the wall of the female member receiving chamber, and reverse inclined shoulder 111 on externally threaded locking member 112. Thus, the present invention may be used in a female coupling member with or without a radial metal seal and seal retainer. Reverse inclined shoulder 110 is between the smaller and larger diameters 114, 115 of the receiving chamber.

Figure 9:
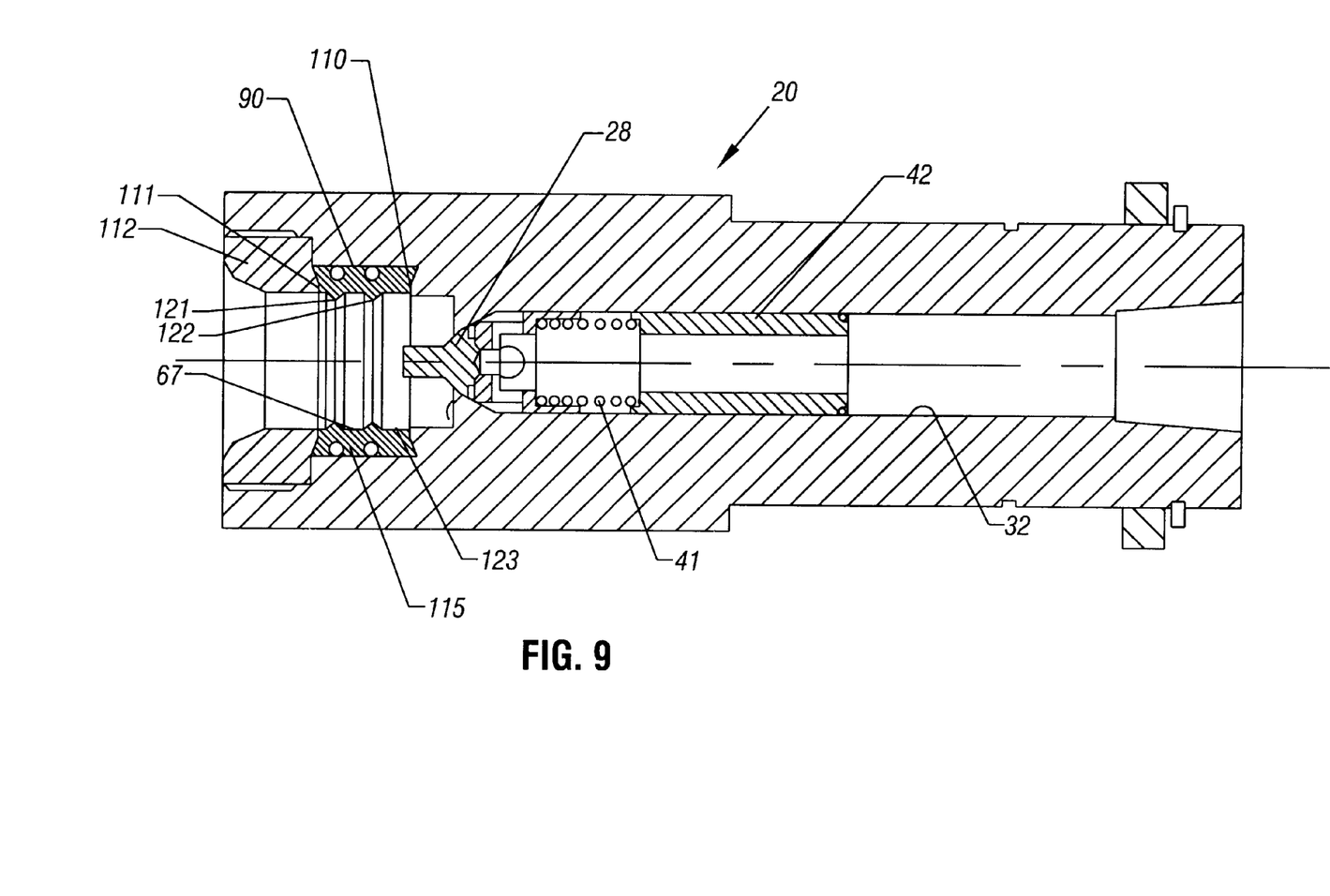
FIG. 9 is a section view of the female member of the coupling of the present invention according to a sixth preferred embodiment.

A sixth preferred embodiment is shown in FIG. 9. In this embodiment, seal 90 has an interfit between reverse inclined shoulder 110 and reverse inclined shoulder 111. One or more of the three radial sealing surfaces 121, 122, 123 is pressure energized.

The coupling and seal of the present invention provide multiple radial sealing surfaces between the male and female coupling members without additional seal retainers or other components. The redundant sealing surfaces help guide the male member probe into the female coupling member and reduce the risk of galling. The present invention also contemplates that at least one of the radial sealing surfaces may be pressure energized. The seal having multiple radial sealing surfaces is restrained from radial movement toward the central axis or bore of the female coupling member, so the male and female members may be separated without risk of blowing out the seal. Other advantages of the present invention include the reusable nature of the seal, the seal can be used to retrofit existing coupling members and seal retainers, and can replace couplings having different seal configurations.

This seal may be made of any elastomer or polymer that is flexible and resilient, and that can withstand the deteriorating effect of the subsea environment. The seal may be made of a relatively pliable elastomeric or polymer material, for example, rubber or synthetic elastomer. Seals of this invention are reusable because they are retained in place upon separation of the male and female members of the coupling.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling member, comprising:
   (a) a female member having an internal bore, a valve for controlling fluid flow through the bore, and a receiving chamber having a plurality of internal shoulders therein; and a pair of reverse inclined shoulder surfaces in the female member bore; and
   (b) a ring-shaped seal insertable into the receiving chamber between the pair of reverse inclined shoulder surfaces, the seal having an outer circumference and an inner circumference, the outer circumference having a thicker cross section than the inner circumference, the pair of reverse inclined shoulder surfaces restraining the seal from moving radially inwardly, the seal having at least two radial sealing surfaces extending radially inwardly from the inner circumference.

2. The undersea hydraulic coupling of claim 1, wherein the ring-shaped seal has a wedge-shaped cross section and a dovetail interfit with the reverse inclined shoulder surfaces.

3. The undersea hydraulic coupling of claim 1 wherein the outer circumference of the ring-shaped seal has a plurality of grooves therein and an O-ring positioned in each groove.

4. The undersea hydraulic coupling of claim 1 wherein one of the reverse inclined shoulder surfaces is on a locking member engageable with the female member.

5. The undersea hydraulic coupling of claim 1 wherein at least one of the radial sealing surfaces extending radially inwardly from the inner circumference is pressure energized.

6. The undersea hydraulic coupling of claim 5 wherein the ring-shaped seal has three radial sealing surfaces.

7. The undersea hydraulic coupling of claim 1 further comprising a seal retainer and a locking member for holding the retainer in the female member, one of the pair of reverse inclined shoulder surfaces being on the seal retainer and the other being on the locking member.

8. The undersea hydraulic coupling of claim 7 further comprising a hollow pressure-energized metal seal retained in the female member by the seal retainer.

9. A female member of an undersea hydraulic coupling, comprising:
   (a) a body member with an internal bore extending therethrough, the internal bore having a receiving chamber adjacent a first end thereof;
   (b) a ring-shaped resilient seal insertable into the receiving chamber and having an outer circumference, an inner circumference, the outer circumference being thicker in cross section than the inner circumference, and a plurality of radial sealing surfaces extending radially inwardly from the inner circumference; and
   (c) a locking member engaged to the receiving chamber, the locking member having a first end that interfits with the ring-shaped resilient seal for holding the seal in the receiving chamber.

10. The female member of an undersea hydraulic coupling of claim 9, further comprising a seal retainer insertable into the receiving chamber, the seal retainer having an internal shoulder surface with interfits with the resilient seal.

11. The female member of an undersea hydraulic coupling of claim 9, wherein the locking member is an externally threaded body engageable with the receiving chamber, one end of the locking member having a reverse inclined shoulder surface.

12. The female member of an undersea hydraulic coupling of claim 9, wherein the seal retainer retains a pressure energized metal seal in the female member.

13. The female member of an undersea hydraulic coupling of claim 9, wherein the ring shaped resilient seal has at least one radial sealing surface extending inwardly from the inner circumference that is pressure-energized.

14. The female member of an undersea hydraulic coupling of claim 9, wherein the ring shaped resilient seal has at least one projection around the outer circumference thereof.

15. An undersea hydraulic coupling member comprising:
   (a) a female member having an internal bore, the internal bore having at least one shoulder surface;
   (b) a locking member engageable with the female member and having an inclined shoulder surface at one end thereof;

(c) a ring-shaped seal having an outer circumference having a thicker cross section than the inner circumference, the seal dimensioned to interfit between the shoulder surface of the female member and the shoulder surface of the locking member, the inner circumference having two sealing surfaces projecting radially inwardly therefrom.

16. The undersea hydraulic coupling member of claim 15 further comprising a seal retainer having an inclined shoulder surface, the locking member engageable with the seal retainer and abutting the shoulder surface of the female member.

17. The undersea hydraulic coupling member of claim 16 wherein the ring-shaped seal has a dovetail interfit between the inclined shoulder surfaces of the seal retainer and locking member.

18. The undersea hydraulic coupling of claim 15 wherein at least one of the sealing surfaces is pressure energized.

19. The undersea hydraulic coupling of claim 15 wherein the coupling member has a poppet valve.

20. The undersea hydraulic coupling of claim 15 wherein the seal has at least one O-ring in a groove around the outer circumference thereof.

* * * * *